US012341286B2

(12) United States Patent
Brennan

(10) Patent No.: US 12,341,286 B2
(45) Date of Patent: Jun. 24, 2025

(54) SUBSEA DUMMY INSERT

(71) Applicant: Siemens Energy Limited, Newcastle Upon Tyne (GB)

(72) Inventor: Cameron Brennan, Bothwell (GB)

(73) Assignee: SIEMENS ENERGY LIMITED, Newcastle Upon Tyne (GB)

( * ) Notice: Subject to any disclaimer, the term of this patent is extended or adjusted under 35 U.S.C. 154(b) by 364 days.

(21) Appl. No.: 18/040,267

(22) PCT Filed: Aug. 12, 2021

(86) PCT No.: PCT/EP2021/072491

§ 371 (c)(1),
(2) Date: Feb. 2, 2023

(87) PCT Pub. No.: WO2022/043078

PCT Pub. Date: Mar. 3, 2022

(65) Prior Publication Data

US 2023/0361499 A1 Nov. 9, 2023

(30) Foreign Application Priority Data

Aug. 26, 2020 (GB) .................................... 2013310

(51) Int. Cl.
*H01R 13/443* (2006.01)
*H01R 13/52* (2006.01)
*H01R 13/523* (2006.01)

(52) U.S. Cl.
CPC ....... *H01R 13/443* (2013.01); *H01R 13/5213* (2013.01); *H01R 13/523* (2013.01)

(58) Field of Classification Search
None
See application file for complete search history.

(56) References Cited

U.S. PATENT DOCUMENTS

| | | | | |
|---|---|---|---|---|
| 4,193,657 A * | 3/1980 | Slone | H01R 13/504 | 439/888 |
| 8,267,707 B2 * | 9/2012 | Rogers | H01R 13/52 | 439/271 |

(Continued)

FOREIGN PATENT DOCUMENTS

| | | |
|---|---|---|
| EP | 2355258 A1 | 8/2011 |
| GB | 2429587 A | 2/2007 |
| WO | 03105282 A1 | 12/2003 |

OTHER PUBLICATIONS

International Search Report and Written Opinion of the International Searching Authority mailed Nov. 29, 2021 corresponding to PCT Application No. PCT/EP2021/072491 filed Aug. 12, 2021.

(Continued)

*Primary Examiner* — Tho D Ta

(57) ABSTRACT

A dummy insert (20) for a plug (12) of a connector assembly (11), the dummy insert (20) comprises a forward end (45) and a rearward end (46), an insert body (22), an array of shuttle pin assemblies (24), a retention plate (26). The insert body (22) has an internal wall (42) and a plurality of guide tubes (36). The plurality of guide tubes (36) extends generally forwardly from the internal wall (42). The retention plate (26) is located rearwardly of the internal wall (42). Each shuttle pin assembly (24) is located at least partly in one guide tube (36) and is retained by the retention plate (26). The insert body (22), the internal wall (42) and the plurality of guide tubes (36) is a monolithic structure.

22 Claims, 5 Drawing Sheets

(56) References Cited

U.S. PATENT DOCUMENTS

| | | | | |
|---|---|---|---|---|
| 9,650,848 | B2 * | 5/2017 | Taylor | E21B 17/20 |
| 9,690,052 | B2 * | 6/2017 | Toth | G02B 6/3849 |
| 10,651,591 | B2 * | 5/2020 | Lerner | H01R 13/005 |
| 2004/0266240 | A1 | 12/2004 | Abbey et al. | |
| 2011/0021049 | A1 | 1/2011 | Ramasubramanian et al. | |
| 2011/0189878 | A1 | 8/2011 | Rogers | |
| 2016/0177680 | A1 * | 6/2016 | Hatcher | B63C 11/52 166/351 |

OTHER PUBLICATIONS

Teledyne ODI Subsea Control and Instrumentation "Nautilus™ Wet Mate Connectors", 2016.

OneSubsea "Controls and Communications Connectors"—Diamould electrical connectors.

* cited by examiner

SUBSEA DUMMY INSERT

FIELD OF INVENTION

This invention relates to a dummy insert for protection of components in a connector used for subsea or underwater applications.

BACKGROUND OF INVENTION

Connections, such as electrical connections, are required to be made under water. For example, a subsea installation for the production of hydrocarbons from a subsea well in which different components of the subsea installation require connecting for power and/or data communication. Such connections may comprise a connection from a topside installation, such as a floating or fixed platform or from an onshore site, to a subsea component via an umbilical or subsea cable. Other connections include electrical connections between different types of subsea equipment, such as a connection between a subsea transformer and subsea switchgear for the transfer of electrical power.

A connector assembly comprises a receptacle and a plug. The receptacle has an array of exposed connector pin conductors and the plug has a corresponding array of socket contacts which are encapsulated in a dielectric oil chamber, where the electrical connection can be safely made during mating of the plug and receptacle. The receptacle connector pin conductors and plug socket contacts are made from copper and are gold-plated. When the receptacle is underwater and not connected to a corresponding plug it is desirable to prevent or inhibit corrosion and electrically insulate exposed gold-plated copper connector pins. The electrical connector pins are expensive to manufacture and cannot be replaced in situ. Overhaul of a defective connector and it's respective cable harness results in costly downtime of subsea equipment. Corrosion and subsequent failure in service can cause attenuation or interruption in the transmission of electrical power and signals, which is highly undesirable.

This invention solves the technical problem of providing a cost-effective subsea corrosion protection and electrical insulation system to inhibit corrosion and electrically insulate exposed gold-plated copper receptacle connector pins that are deployed subsea.

STATEMENT OF INVENTION

In accordance with a first aspect of the present disclosure there is provided a a dummy insert for a plug of a connector assembly, the environmental insert comprises a forward end and a rearward end, an insert body, an array of shuttle pin assemblies, a retention plate and the insert body has an internal wall and a plurality of guide tubes, the plurality of guide tubes extends generally forwardly from the internal wall, the retention plate is located rearwardly of the internal wall, each shuttle pin assembly is located at least partly in one guide tube and is retained by the retention plate, wherein the insert body, the internal wall and the plurality of guide tubes is a monolithic structure.

The environmental insert may further comprise a diaphragm assembly has a diaphragm and a front plate, the diaphragm surrounding at least a portion of the guide tubes, the front plate is located at the forward end of the environmental insert, the front plate seals the front end of the diaphragm assembly and the environmental insert, the front plate comprises an array of apertures and each aperture is engaged by one of the shuttle pins at its opposite end to the retention plate.

The diaphragm assembly and the insert body form a chamber, the chamber may be filled with a dielectric fluid.

The environmental insert may comprise a support sleeve, the support sleeve may be located radially outwardly of the diaphragm, the support sleeve may abut the insert body and abut the front plate.

The environmental insert may comprise a seal carrier, wherein the seal carrier may be located rearwardly of the retention plate and seals against the insert body.

The seal carrier may comprise an annular recess and an O-ring seal, the O-ring seal is located partly in the annular recess, the O-ring seal seals against a radially inward surface of the insert body.

The shuttle pin assembly may comprise a spring and a shuttle pin, the spring connects to the retention plate at one end and at its other end connects to the shuttle pin.

The retention plate may comprise an array of bosses, each shuttle pin assembly is retained within one boss of the array of bosses.

Each boss of the array of bosses may extend into one of the guide tubes of the array of guide tubes.

The retention plate may comprise an array of holes, at least one of the holes may be aligned with at least one of the guide tubes and at least one of the other holes may not be aligned with any of the guide tubes.

The internal wall may comprise an array of ports, each port of the array of ports extends through the internal wall.

The front plate may comprise a stiffener plate and a sealing member.

The sealing member may form wiper-seals within the apertures of the array of apertures.

Each guide tube of the plurality of guide tubes may comprise an internal surface. At least the internal surface may be coated with an electrically insulating layer. The electrically insulating layer may be any one or more of the group comprising acrylonitrile butadiene rubber or other rubber based materials A radially inward surface of the insert body may comprise an annular groove into which a circlip is located. The circlip may retain the retention plate from movement in a rearwards direction relative to the insert body.

The monolithic structure may be formed from an electrically non-conductive or electrically insulating material. Such a material may be a plastic or a polymer.

In another aspect of the present disclosure, there is provided a plug for a connector assembly, the plug comprising a casing and the dummy insert as described in the above paragraphs. The dummy insert may be housed within the casing such that the front plate is exposed.

In another aspect of the present disclosure, there is provided a plug assembly for a connector assembly, the plug assembly comprising the plug as described in the paragraph above, a plug adapter and a handle. The plug assembly may be connected to the plug adapter and the handle may be flexibly attached to the plug adapter at the opposite end of the plug adapter to the plug assembly.

In another aspect of the present disclosure there is provided a receptacle and the plug as described above. The receptacle may comprise a receptacle housing and mounted therein an array of connector pins. The plug mates to the receptacle such that the receptacle housing at least partly surrounds at least a part of the plug. The array of connector pins extends through the array of apertures and engages the shuttle pin assemblies within the guide tubes. The array of connector pins is surrounded by the guide tube internal surfaces.

In another aspect of the present disclosure there is provided a method of assembling a dummy insert as described above, the method comprising the steps inserting the shuttle pin assemblies into the guide tubes, engaging the shuttle pin assemblies and the retention plate, inserting the retention plate into the insert body.

The method may comprise the step inserting the insert body, shuttle pin assemblies and guide tubes into a diaphragm assembly.

The step of inserting may be carried out in a bath and submerged in a dielectric fluid.

In another aspect of the present disclosure, there is provided a method of manufacturing a dummy insert, the method comprising the step injection moulding a monolithic structure comprising the insert body, the plurality of guide tubes and the internal wall.

The method of manufacturing a dummy insert may comprise the step machining at least one annular groove on an internal surface of the insert body.

BRIEF DESCRIPTION OF THE DRAWINGS

An example of a dummy insert, a plug comprising the dummy insert, a connector assembly comprising the plug and an associated method of assembly in accordance with the present invention will now be described with reference to the accompanying drawings in which.

DETAILED DESCRIPTION OF INVENTION

Figure 1:
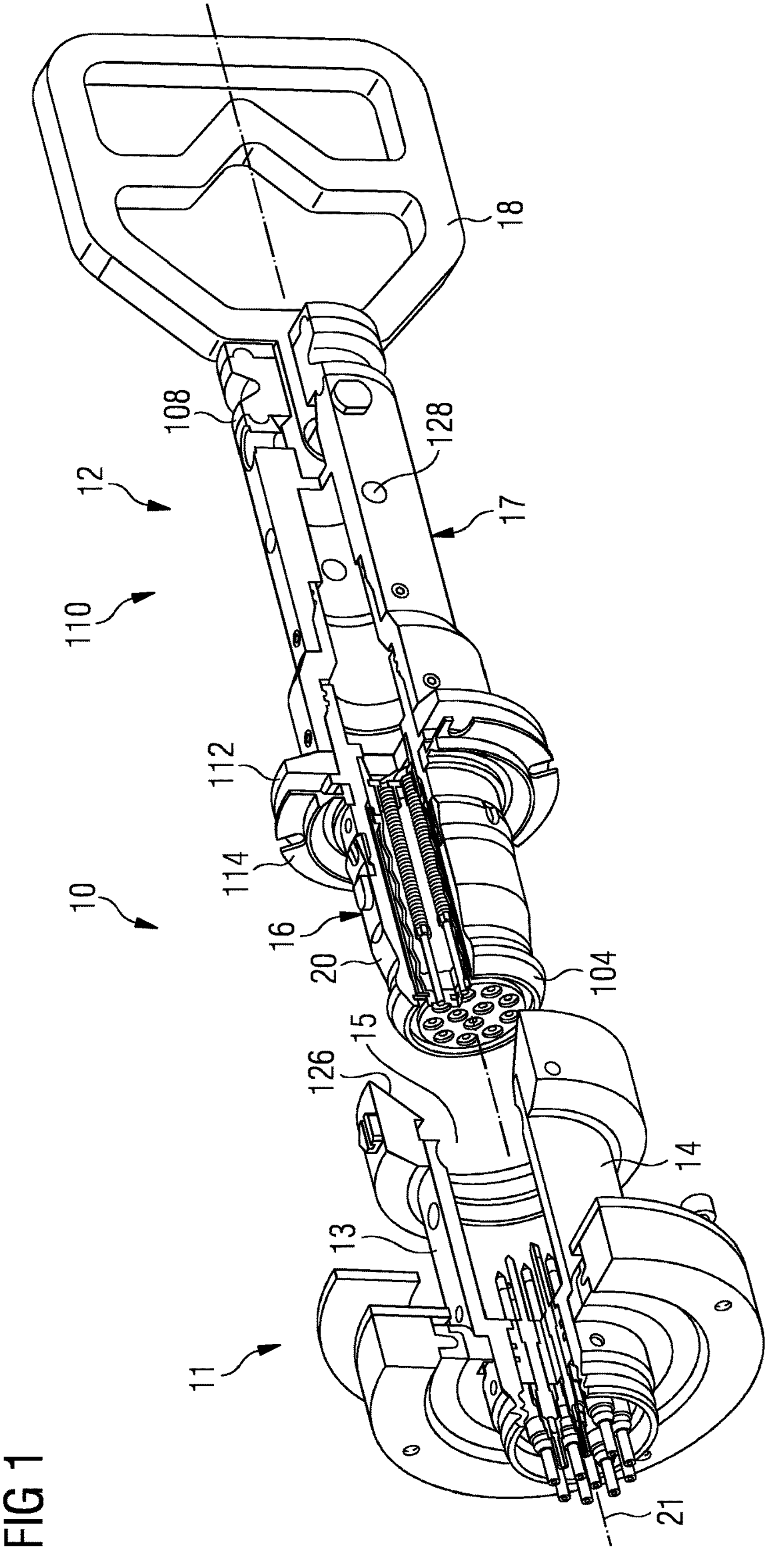
FIG. 1 is an isometric view of a connector assembly in an unmated condition, the connector assembly comprises a plug and a receptacle and is in accordance with the present invention. The receptacle has parts not shown for clarity reasons. The plug and receptacle are shown with sections to show internal features.

FIG. 1 shows a connector assembly 10 comprising a receptacle 11 and a plug 12 in an unmated condition. The connector assembly 10 has a central axis 21, which passes through the receptacle 11 and the plug 12 alone or when mated. The plug 12 is seen here connected to an adapter 17 which is itself attached to a handle 18. The handle 18 is suitable for a remotely operated vehicle to hold and manipulate the plug 12 to mate and de-mate the plug 12 and receptacle 11.

The plug 12 will be described in greater detail later. The receptacle 11 is well known in the art, but briefly, comprises a receptacle housing 13 and mounted therein an array of connector pins 14. The connector pins 14 form a part of an electrical connection. The receptacle housing 13 defines an opening 15. To mate the receptacle 11 and the plug 12, the plug 12 is translated along the central axis 21 towards the receptacle 11 and into the opening 15. When the plug 12 and receptacle 11 are fully mated, the receptacle housing 13 at least partly surrounds a front or forward part 16 of the plug 12. Each connector pin of the array of connector pins 14 extends through sealing apertures in the plug 12 and engages one of the array of shuttle pin assemblies as described later in more detail. Within the plug 12 is a chamber filled with dielectric fluid. The array of connector pins 14 are housed within the chamber and are immersed in the dielectric fluid to thereby provide a safe and inert environment that protects the connector pins 14 from corroding as well as electrically insulating the connector pins 14.

A conductor part of the connector pin 14 are made from copper and are plated in gold. When the plug 12 and receptacle 11 are not mated and the receptacle 11 is deployed subsea, the gold plated copper connector pins 14 are in contact with seawater and are liable to corrosion. This corrosion is highly undesirable because the connectors are expensive to manufacture and are difficult and costly to replace when deployed subsea. In addition, corrosion of the connectors pins 14 may not be detected and subsequent failure in service can be detrimental to other services using the connection.

Figure 2:
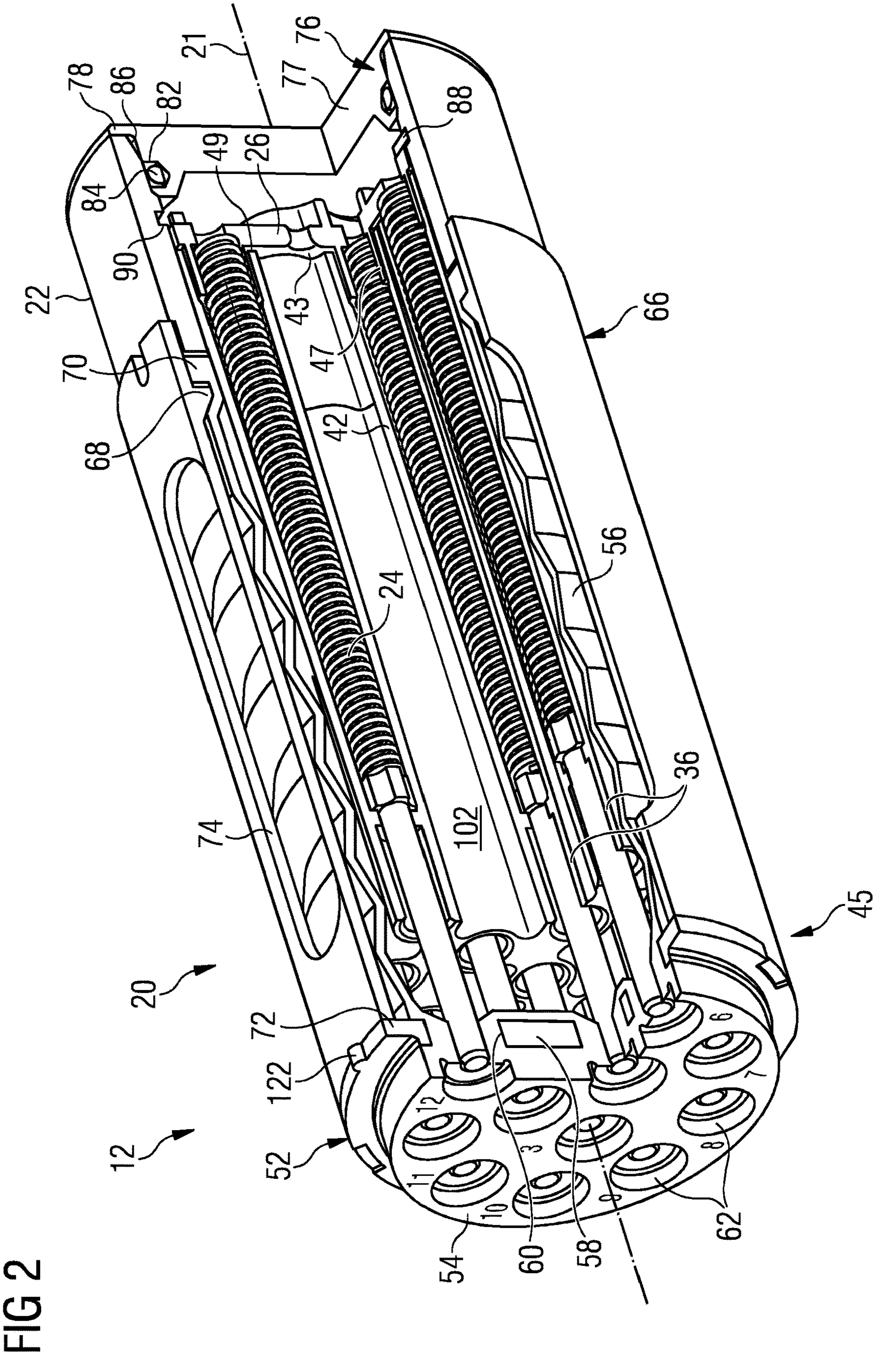
FIG. 2 is a section isometric view of a dummy insert and which may be part of the plug.

Referring to FIG. 2, the present disclosure relates to a dummy insert 20 which is a part of the plug 12. Indeed, the dummy insert 20 can be seen in the section of the front end 16 of the plug 12 in FIG. 1. The dummy insert 20 effectively forms part of a subsea protective cap and is a cost-effective alternative with enhanced electrical insulation properties compared to a conventional electrical dummy plug connector with blank terminations. The dummy insert 20 or environmental insert 20 provides an inert environment such that the connector pins 14 do not corrode when mated to the dummy insert 20. Further, the dummy insert 20 provides an electrically insulative environment such that there is negligible earth leakage and is therefore very safe if high voltages are applied to subsea receptacle connectors inadvertently or during subsea equipment testing.

Figure 3:
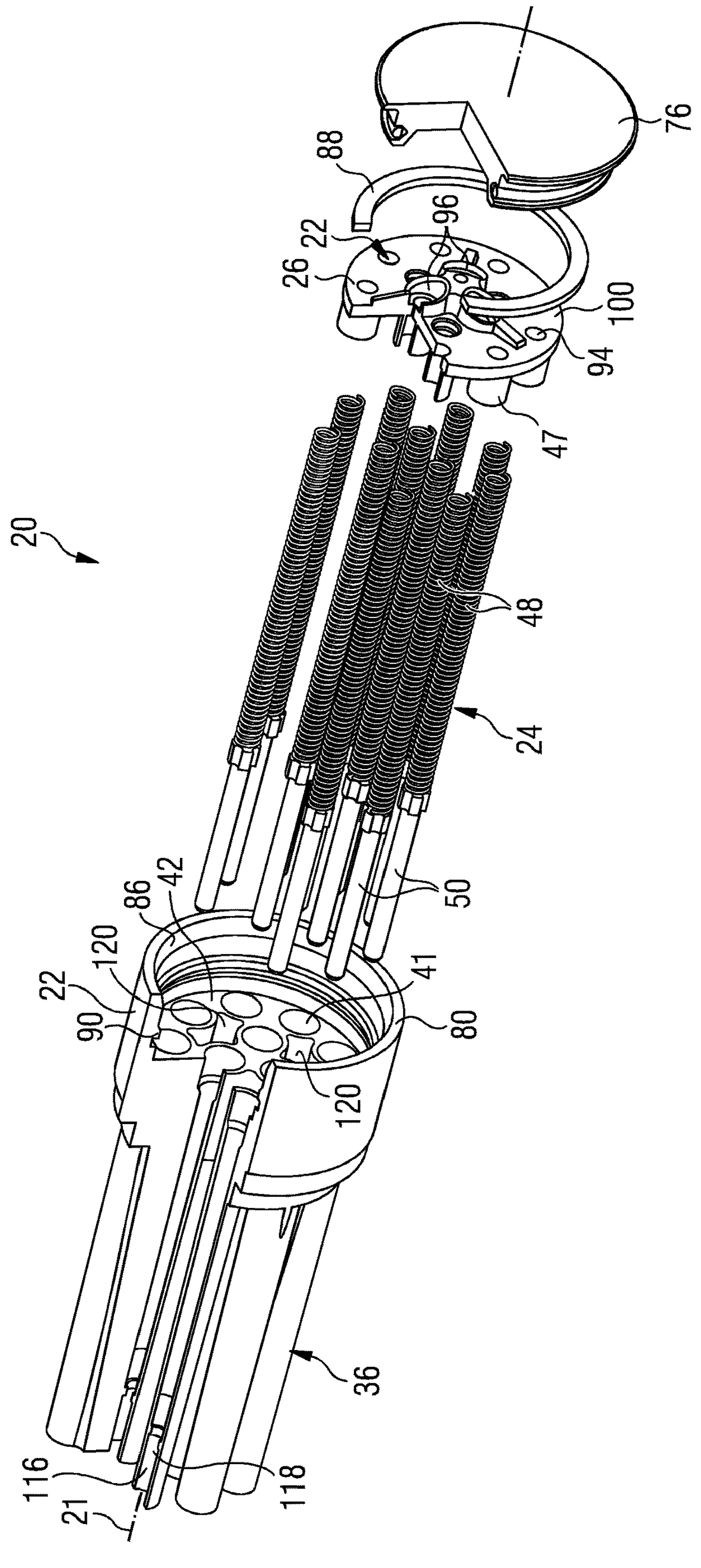
FIG. 3 is an exploded view of the dummy insert and having a section portion to reveal its internal arrangement and is in accordance with the present invention.

FIG. 2 shows the dummy insert 20 in an isometric view and having a section to show its internal details. FIG. 3 is an exploded view of part of the dummy insert 20 for use with the plug 12 of the connector assembly 10.

The dummy insert 20 comprises the centreline 21, a forward end 45 and a rearward end 46, an insert body 22, an array of shuttle pin assemblies 24 and a retention plate 26.

In this description, the terms 'forward and 'front' relate to the left-hand side of the dummy insert 20 and the plug 12 as a whole and as seen in the Figures. The left-hand side comprises the components that engage with the receptacle 11. The terms 'backward', 'rearward' and 'back' relate to the right-hand side of the dummy insert 20 and the plug 12 as a whole and as seen in the Figures. The right-hand side comprises the components of the plug 12 that engage with the adapter 17. Thus a 'forward' face, facing or surface simply faces in the direction towards the left on the Figures or the front end 45 and similarly 'rearward' face, facing or surface simply faces in the direction towards the right on the Figures or the back end 46. The terms forward and forwardly simply refer to the direction towards the front end 45. The terms backward, backwardly, rearward and rearwardly simply refer to the direction towards the back end 46.

The insert body 22 has an internal wall 42 and a plurality of guide tubes 36. The internal wall 42 is generally circular in this example and extends across the internal cross-sectional area of the insert body 22. Here the insert body 22 is generally tubular having a circular cross-section, although in other embodiments the insert body 22 can have other cross-sectional shapes.

The plurality of guide tubes 36 extend generally forwardly from a forward side 43 of the internal wall 42 and such that there are openings 41 through the internal wall 42. Preferably, the openings 41 are circular, but may be other shapes and particularly depending on the shape of the insert body 22. Each opening 41 transitions into the interior of each respective guide tube 36. The internal wall 42 further comprises an array of ports 120, in this example there are three ports 120. Each port 120 extends through the internal wall 42 and fluidly connects the volumes immediately forwardly and rearwardly of the internal wall 42.

The retention plate 26 is located within the insert body 22 and rearwardly of the internal wall 42. The retention plate 26 is secured in place by a circlip 88 which fits into an annular groove 90 in a radially inner surface 86 of the insert body 22. The circlip 88 prevents the retention plate 26 from moving in an axially rearward direction. The retention plate 26 comprises an array of bosses 47 on its forward face 49. Each boss 47 of the array of bosses 47 extends through each respective opening 41 into one of the guide tubes 36 of the array of guide tubes 36. The opening 41 of the guide tubes 36 and a short length of the guide tubes 36 have a greater internal diameter than the remainder of the guide tubes 36 such that the bosses 47 and remainder of the guide tubes 36 have a very similar inner diameter to enable mating of these parts. Thus, no step is apparent when transitioning between the internal surfaces of the guide tubes 36 and the bosses 47.

Each shuttle pin assembly 24 comprises a spring 48 and a shuttle pin 50. The spring 48 is connected to the retention plate 26 at its rearward end via the bosses 47 and at its other end the spring 48 is connected to the shuttle pin 50. The shuttle pin 50 is a generally cylindrical rod and at its free or forward end has a concave surface. The concave surface engages a correspondingly convex end of the connector pin 14 to ensure contact and good alignment of connector pin 14 and shuttle pin 50.

When the dummy insert 20 is assembled, each shuttle pin assembly 24 is retained at its rearward end, i.e. the spring 48, by and within one boss 47 of the array of bosses 47.

Each shuttle pin assembly 24 is located at least partly in one of the guide tubes 36 and is retained by the retention plate 26.

The dummy insert 20 further comprises a diaphragm assembly 52 which is omitted from FIG. 3 but is best seen in FIG. 2 and can also be seen in FIG. 1. The diaphragm assembly 52 has a diaphragm 56 and a front plate 54. The diaphragm 56 surrounds at least a portion of the guide tubes 36 and is sealingly engaged to the insert body 22. The diaphragm 56 is flexible such that it can expand and contract the volume which it contains. The diaphragm 56 has a concertina profile to further enhance its ability to accommodate changes to its contained volume. The diaphragm 56 is generally tubular and the concertinas provide some radial stiffness with respect to keeping its cross-section generally circular. The front plate 54 is located at the forward end 45 of the dummy insert 20 and seals the front end 45 of the diaphragm assembly 52 and the dummy insert 20.

The front plate 54 is monolithically formed with the diaphragm 56 as one piece. The front plate 54 and the diaphragm 56 are formed from an elastomeric material and in this example silicone rubber, but other similar materials may be used. The front plate 54 comprises a stiffener plate 58 which is mostly surrounded by the elastomeric material. The stiffener plate 58 is formed of a rigid material such as a plastic and in this example is formed of poly-ether-ether-ketone (PEEK). The stiffener plate 58 comprises 'over-sized' apertures 60 which correspond to the positions of the guide tubes 36 such that a connector pin 14 of the receptacle 12 may pass through the front plate 54 to be shrouded by the insert guide tube's internal surface 116. The elastomeric material extends inside the apertures 60 such that the aperture is 'under-sized' and forms a sealing member 62 within each aperture 60. The sealing member 62 restricts the size of the aperture 60 to form a wiper-seal 64. The stiffener plate 58 provides additional radial stiffness to the wiper-seals 64 to ensure sufficient seal compression is achieved. As best seen in FIG. 2 each shuttle pin 50 is sealingly engaged with the sealing member 62 in the unmated state. Thus, the front plate 54 comprises an array of apertures 60, and each aperture 60 is engaged, i.e. penetrated at least partly, by one of the shuttle pins 50 at its opposite end to the retention plate 26. As a connector pin 14 of the receptacle 12 engages with the shuttle pin 50 and pushes the shuttle pin 50 rearwardly by compressing the compression spring 48, the wiper-seal 64 wipes the connector pin 14 of any seawater (or any other contaminants) as it passes through and into the dummy insert 20. The wiper-seal 64 can be seen in FIG. 5 more clearly and is essentially a series of annular ribs on the elastomeric material that extend inwardly towards the centre of the apertures 60.

The dummy insert 20 further comprises a support sleeve 66, which is located radially outwardly of the diaphragm 56. The support sleeve 66 is generally tubular and abuts the insert body 22 at its rearward end and abuts the front plate 54 at its forward end. The support sleeve 66 comprises internal shoulder 68 that extends radially inwardly and which locates against a sealing band 70 of the diaphragm 56 in turn seals against the insert body 22 thereby sealing the rearward end 46 of the dummy insert 20. At the front end 45 of the dummy insert 20, the stiffener plate 58 comprises a radially outwardly extending flange 72 and which abuts the support sleeve 66. The support sleeve 66 has a number of openings 74 to allow the hydrostatic pressure from seawater to act on the diaphragm 56 and to permit the expansion of the diaphragm for volume compensation of the dummy insert chamber 102.

The dummy insert 20 further comprises a seal carrier 76, which is located rearwardly of the retention plate 26 and is attached to the insert body 22. The seal carrier 76 has a generally cylindrical body 77 and an annular flange 78 that extends radially outwardly from and rearwardly on the cylindrical body 77. The cylindrical body 77 has a diameter slightly less than that of the insert body 22 and inserts into the insert body 22. The flange 78 abuts the rearward facing surface 80 of the insert body 22. The cylindrical body 77 has an annular recess 82 on its radially outer surface and an O-ring seal 84 which is located partly in the annular recess 82 such that the O-ring seal 84 seals against a radially inward surface 86 of the insert body 22.

The retention plate 26 comprises an array of holes 92 which fluidly connect a front face 49 and a rear face 100 of the retention plate 26. A first set of holes 94 of the array of holes 92 are aligned with the bosses 47 and therefore the guide tubes 36. That is, one hole 94 is aligned with one of the bosses 47 and in this example each and every boss 47 has a hole 94 aligned with it. A second set of holes 96 of the array of holes 92 are not aligned with the bosses 47 but are aligned with the ports 120, although this alignment is not necessary.

The diaphragm assembly 52, seal carrier 76 and the insert body 22 form a chamber 102. The chamber 102 is filled with the dielectric fluid. The dielectric fluid, may be an oil, occupies all of the cavities within the diaphragm assembly 52, such as inside and around the guide tubes 36 and occupies the cavities between the retention plate 26 and the seal carrier 76.

When the plug 12 and receptacle 11 are being mated the connector pins 14 engage the shuttle pins 50. The shuttle pins 50 are pushed through the openings 62 and the springs 48 are compressed. As the connector pins 14 are further inserted into the dummy insert 20 the dielectric fluid in the guide tubes 36 is mainly forced rearwardly and flows out of the holes 94 into the chamber 102 between the retention plate 26 and the seal carrier 76 and then flows back into the chamber 102 via the set of holes 96 and ports 120. The diaphragm 56 expands to accommodate the volume of dielectric fluid displaced by the connector pins 14.

Figure 4:
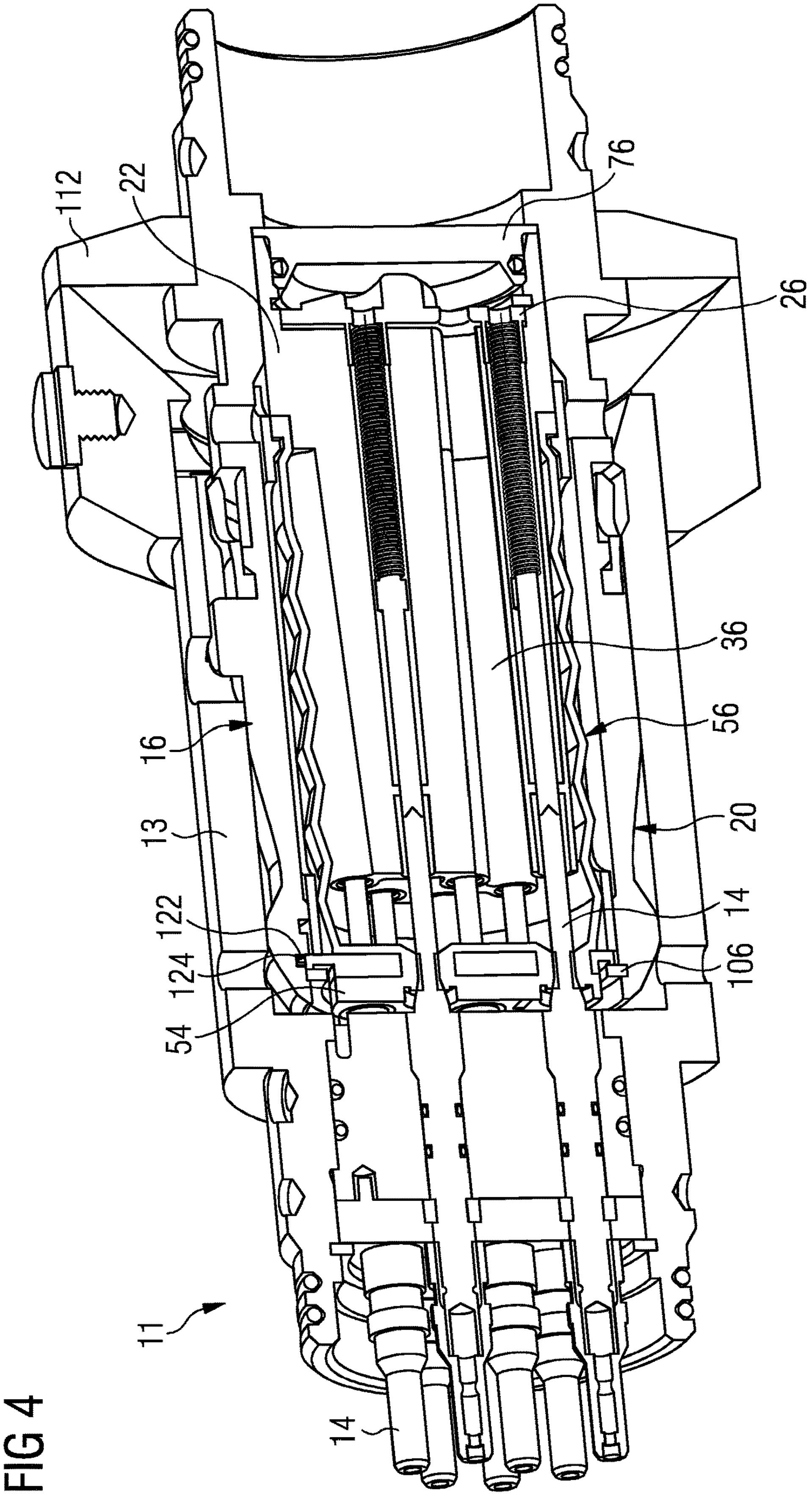
FIG. 4 is a view on a section of the plug and the dummy insert mated to a receptacle.
Figure 5:
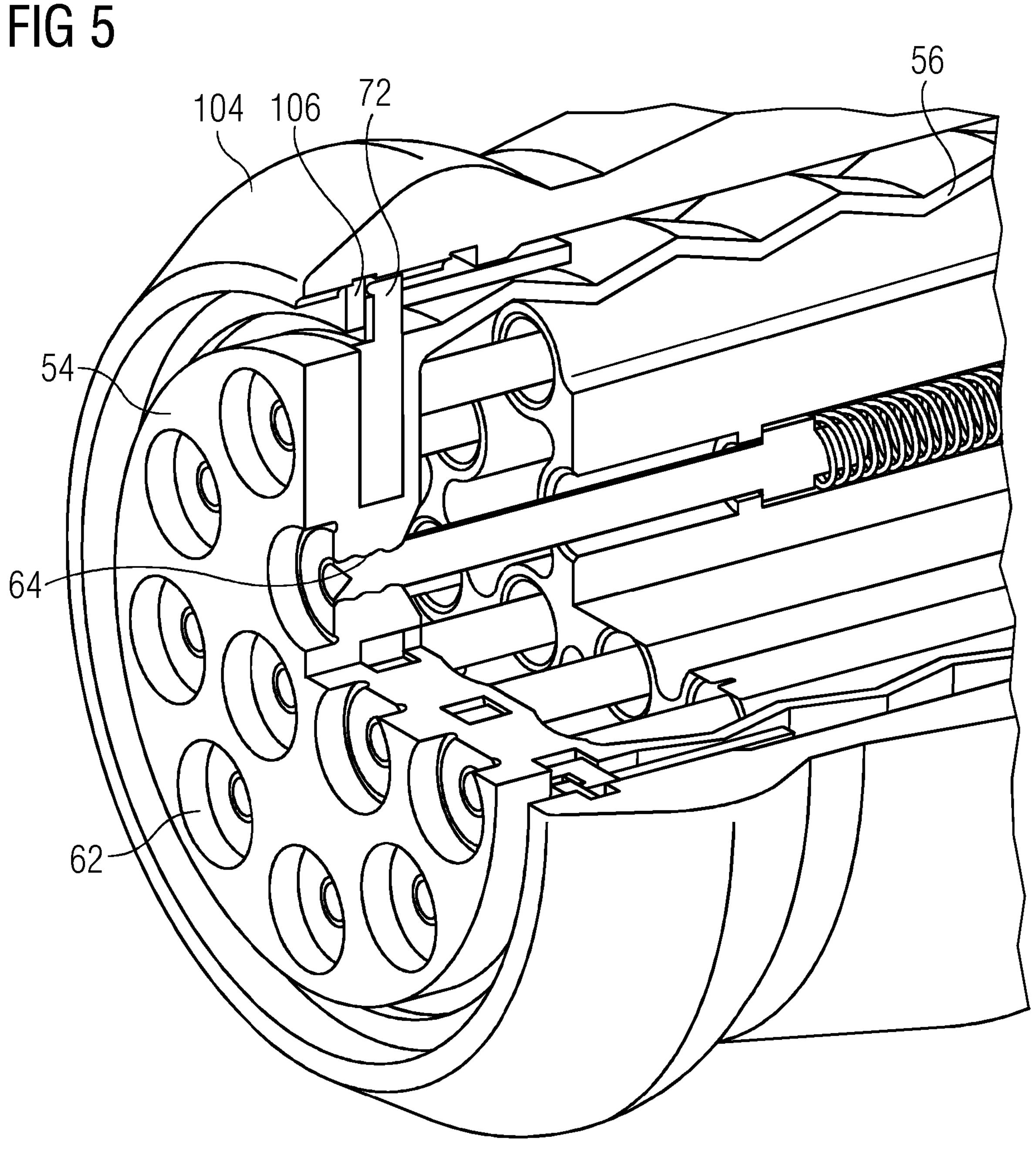
FIG. 5 is a section and enlarged isometric view of a front end of the dummy insert within a plug.

Referring back to FIG. 1 and to FIGS. 4 and 5, the plug 12 comprises a casing 104. The dummy insert 20 is housed within the casing 104 and such that the front plate 54 of the diaphragm assembly 52 is exposed. In other words, the front face of the front plate 54 may be seen when looking at the front end 45 and in a generally rearward direction. A circlip 106 axially retains the dummy insert 20 within the casing 104 by contacting the forward face of the flange 72. A male key feature 122 protruding radially outwardly on the flange 76 of the stiffener plate 58 and a corresponding female key feature 124 on the casing 104 rotationally constrain the dummy insert 20 within the casing 104. When assembled, the dummy insert 20 is inserted from the front of the casing 104 and so that the forward face of the flange 72 abuts the rearward face of the circlip 106 once inserted within the casing 104.

A plug assembly 110 for connecting the plug 12 to the receptacle 11 comprises the plug 12, the plug adapter 17 and the handle 18. The plug 12 is secured to the plug adapter 17. The handle 18 is flexibly attached, via a flexible attachment 108, to the plug adapter 17 at the opposite end of the plug adapter 17 to the plug 12. The flexible attachment 108 is formed from a tough rubber compound, but other flexible attachments are possible. The plug assembly 110 has a stroke limiting flange 112 and a mate indicator 114 located at or near the rearward part of the plug 12. When the plug 12 and the receptacle 11 are mated, the mate indicator 114 is deformed and captured between the stroke limiting flange 112 and the receptacle capture cone 126. FIG. 1 shows the stroke limiting flange 112 and a mate indicator 114 before mating of the plug 12 and receptacle 11, whereas FIG. 4 shows the plug 12 and receptacle 11 when mated although the seal 114 has been omitted.

The method of assembling the dummy insert 20 comprises the steps inserting the shuttle pin assemblies 24 into the guide tubes 36 and inserting the retention plate 26 and circlip 88 into the insert body 22, such that each off the bosses 47 are located within the respective openings 41 and each of the springs 48 are located within the respective bosses 47. The next step is to axially slide the support sleeve 66 over the diaphragm assembly 52 such that it abuts the flange 72 and engages the sealing band 70. Then the insert body 22, shuttle pin assemblies 24 and retention plate 26 are inserted into a diaphragm assembly 52 before inserting the seal carrier 76 with O-ring 84 whilst fully submerged in oil (or other dielectric fluid) to facilitate oil filling of the chamber 102 within the dummy insert 20. For this step of assembling the dummy insert is carried out in a bath of oil or other dielectric fluid. Alternatively, the oil or other dielectric fluid may be injected into the dummy insert after assembly.

The method of manufacturing the dummy insert comprising injection moulding the insert body 22, the plurality of guide tubes 36 and the internal wall 42 as a monolithic structure. Thus, the insert body 22, the plurality of guide tubes 36 and the internal wall 42 are a monolithic structure. The method further comprises machining the annular groove 90 on an internal surface 86 of the insert body 22.

The method of manufacturing the dummy insert may comprise applying a coating or composite layer 118 on an internal surface 116 of the guide tubes 36 where the receptacle pins 14 are shrouded during mating. The coating 118 is an electrically insulating material and may be of a compliant nature such as silicone rubber, but other resilient materials are equally usable such as acrylonitrile butadiene rubber (NBR) or other rubber based materials.

Thus, the dummy insert 20 described herein reduces assembly part count and labour time when assembling it. The dummy insert 20 combines all the shuttle pin/compression spring guides tubes into a single component and reduces the number of individual parts that need to be assembled. This dummy insert 20 reduces damaging environmental impact due to less waste by removing any gold-plated copper conductors used in conventional dummy plugs purely for receptacle pin protection. By virtue of the injection moulding manufacture of the dummy insert 20, significant cost savings associated with replacing all individual machined and gold-plated copper conductors are realised.

Furthermore, the rearward end of the plug 12 is seawater flooded via ports 128 within the adaptor 17 to remove any pressure differentials. This allows full pressure compensation across the dummy insert 20 and within the plug 12 to be achieved without requiring additional assembly operations involving void filling the back end of a connector with a suitable incompressible medium such as oil or gel.

A further advantage of this dummy insert 20 is improved insulation resistance compared to current electrical dummy plug connectors. The dummy insert 20 provides increased creepage distances, superior insulation quality from shrouding the receptacle pin conductors 14 with a high volume resistivity material and reduced earth leakage through the omission of copper socket contacts within the dummy insert 20.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A dummy insert (20) for a plug (12) of a connector assembly (11), the dummy insert (20) comprising:
- a forward end (45) and a rearward end (46);
- an insert body (22);
- an array of shuttle pin assemblies (24);
- a retention plate (26); and
- a seal carrier (76); and
- the insert body (22) having an internal wall (42) and a plurality of guide tubes (36), the plurality of guide tubes (36) arranged to extend generally forward from the internal wall (42), and the retention plate (26) located rearward of the internal wall (42), and the seal carrier (76) located rearwardly of the retention plate (26) and seals against the insert body (22), wherein each shuttle pin assembly (24) is located at least partly in one guide tube (36) and is retained by the retention plate (26), and wherein the insert body (22), the internal wall (42) and the plurality of guide tubes (36) cooperate to form a monolithic structure.

2. A dummy insert (20) as claimed in claim 1, wherein the seal carrier (76) comprises an annular recess (82) and an O-ring seal (84), the O-ring seal (84) located partly in the annular recess (82) and arranged to define a seal against a radially inward surface (86) of the insert body (22).

3. A dummy insert (20) as claimed in claim 1, wherein the shuttle pin assembly (24) comprises a spring (48) and a shuttle pin (50), the spring (48) connects to the retention plate (26) at one end and at its other end connects to the shuttle pin (50).

4. A dummy insert (20) as claimed in claim 1, wherein the retention plate (26) comprises an array of holes (92), at least one of the holes (94) is aligned with at least one of the guide tubes (36) and at least one of the other holes (96) is not aligned with any of the guide tubes (36).

5. A dummy insert (20) as claimed in claim 1 wherein the internal wall (42) comprises an array of ports (120), each port of the array of ports (120) extends through the internal wall (42).

6. A dummy insert (20) as claimed in claim 1, wherein each guide tube of the plurality of guide tubes (36) comprises an internal surface (116) and wherein at least the internal surface (116) is coated with an electrically insulating layer (118), the electrically insulating layer (118) selected from the group comprising acrylonitrile butadiene rubber and other rubber based materials.

7. A dummy insert (20) as claimed in claim 1, wherein a radially inward surface (86) of the insert body (22) comprises an annular groove (90) into which a circlip (88) is located, the circlip (88) retains the retention plate (26) from movement in a rearwards direction relative to the insert body (22).

8. A dummy insert (20) as claimed in claim 1, wherein the monolithic structure (22, 42, 36) is formed from an electrically non-conductive or electrically insulating material.

9. A dummy insert (20) as claimed in claim 1, further comprising:

a diaphragm assembly (52) having a diaphragm (56) and a front plate (54), the diaphragm (56) surrounding at least a portion of the guide tubes (36), the front plate (54) located at the forward end (45) of the dummy insert (20), the front plate (54) forming a seal at the front end (45) of the diaphragm assembly (52) and the dummy insert (20), the front plate (54) comprises an array of apertures (60) and each aperture (60) is engaged by one of the shuttle pins (50) at its opposite end to the retention plate (26).

10. A dummy insert (20) as claimed in claim 9, wherein, the diaphragm assembly (52) and the insert body (22) cooperate to forma chamber (102), and the chamber (102) is filled with a dielectric fluid.

11. A dummy insert (20) as claimed in claim 9, further comprising:

a support sleeve (66), the support sleeve (66) located radially outwardly of the diaphragm (56) and abutting the insert body (22) and the front plate (54).

12. A dummy insert (20) as claimed in claim 9, wherein the front plate (54) comprises a stiffener plate (58) and a sealing member (62), the sealing member (62) forms wiper-seals (64) within the apertures (60) of the array of apertures (60).

13. A dummy insert (20) as claimed in claim 1, wherein the retention plate (26) comprises an array of bosses (47), each shuttle pin assembly (24) is retained within one boss of the array of bosses (47).

14. A dummy insert (20) as claimed in claim 13, wherein each boss of the array of bosses (47) extends into one of the guide tubes (36) of the array of guide tubes (36).

15. A plug (12) for a connector assembly (10), the plug (12) comprising a casing (104) and the dummy insert (20) as claimed in claim 9, the dummy insert (20) housed within the casing (104) such that the front plate (54) is exposed.

16. A plug assembly for a connector assembly (10), the plug assembly comprising the plug (12) as claimed in claim 15, a plug adapter (17) and a handle (18), the plug assembly connected to the plug adapter (17), and the handle (18) flexibly attached to the plug adapter (17) at the opposite end of the plug adapter (17) to the plug assembly (12).

17. A connector assembly (10) comprising:

the plug (12) as claimed in claim 15, a receptacle including a receptacle housing (13), an array of connector pins mounted within the receptacle, the plug (12) mates to the receptacle (11) such that the receptacle housing (13) at least partly surrounds at least a part of the plug (12) and the array of connector pins (14) extends through the array of apertures (60) and engages the shuttle pin assemblies (24) within the guide tubes (36), the array of connector pins (14) is surrounded by the guide tube (36) internal surfaces (116).

18. A method of assembling a dummy insert (20) as claimed in claim 9, the method comprising:

inserting the shuttle in assemblies (24) into the guide tubes (36), engaging the shuttle pin assemblies (24) and the retention plate (26), inserting the retention plate (26) into the insert body (22), inserting the insert body (22), shuttle pin assemblies (24) and guide tubes (36) into the diaphragm assembly (52).

19. A method of assembling a dummy insert (20) as claimed in claim 18, wherein the step of inserting is carried out in a bath and submerged in a dielectric fluid.

20. A method of assembling a dummy insert (20) as claimed in claim 1, the method comprising the steps inserting the shuttle pin assemblies (24) into the guide tubes (36), engaging the shuttle pin assemblies (24) and the retention plate (26), inserting the retention plate (26) into the insert body (22).

21. A method of manufacturing a dummy insert as claimed in claim 20, the method comprising the step injection moulding a monolithic structure comprising the insert body (22), the plurality of guide tubes (36) and the internal wall (42).

22. A method of manufacturing a dummy insert as claimed in claim 21, the method comprising the step machining at least one annular groove (90) on an internal surface (86) of the insert body (22).

* * * * *